United States Patent
Sandberg et al.

(10) Patent No.: US 11,658,808 B2
(45) Date of Patent: May 23, 2023

(54) RE-ENCRYPTION FOLLOWING AN OTP UPDATE EVENT

(71) Applicant: Arm Limited, Cambridge (GB)

(72) Inventors: Andreas Lars Sandberg, Cambridge (GB); Matthias Lothar Boettcher, Cambridge (GB); Prakash S. Ramrakhyani, Austin, TX (US)

(73) Assignee: Arm Limited, Cambridge (GB)

( * ) Notice: Subject to any disclaimer, the term of this patent is extended or adjusted under 35 U.S.C. 154(b) by 753 days.

(21) Appl. No.: 16/546,596

(22) Filed: Aug. 21, 2019

(65) Prior Publication Data
US 2021/0058237 A1    Feb. 25, 2021

(51) Int. Cl.
| | |
|---|---|
| *H04L 9/06* | (2006.01) |
| *H04L 9/32* | (2006.01) |
| *G06F 13/16* | (2006.01) |
| *G06F 21/72* | (2013.01) |
| *G06F 12/14* | (2006.01) |

(52) U.S. Cl.
CPC ........ *H04L 9/0656* (2013.01); *G06F 12/1408* (2013.01); *G06F 13/1668* (2013.01); *G06F 21/72* (2013.01); *H04L 9/3242* (2013.01)

(58) Field of Classification Search
CPC . H04L 9/0656; H04L 9/3242; G06F 12/1408; G06F 13/1668; G06F 21/72
See application file for complete search history.

(56) References Cited

U.S. PATENT DOCUMENTS

| | | | | |
|---|---|---|---|---|
| 10,608,813 | B1* | 3/2020 | Lazier | G06F 21/602 |
| 2015/0371063 | A1* | 12/2015 | Van Antwerpen | G09C 1/00 |
| | | | | 713/190 |
| 2016/0154746 | A1* | 6/2016 | Cooke | G06F 12/0811 |
| | | | | 711/123 |
| 2019/0130125 | A1* | 5/2019 | Yoshino | H04L 9/06 |
| 2019/0394021 | A1* | 12/2019 | Awad | G06F 3/0623 |
| 2020/0401534 | A1* | 12/2020 | Nardi | G06F 21/79 |

OTHER PUBLICATIONS

B. Rogers, S. Chhabra, M. Prvulovic and Y. Solihin, "Using Address Independent Seed Encryption and Bonsai Merkle Trees to Make Secure Processors OS-and Performance-Friendly," 40th Annual IEEE/ACM International Symposium on Microarchitecture (MICRO 2007), 2007, pp. 183-196.*

* cited by examiner

*Primary Examiner* — Matthew T Henning
(74) *Attorney, Agent, or Firm* — Nixon & Vanderhye P.C.

(57) ABSTRACT

Memory control circuitry controls access to data stored in memory, and memory security circuitry generates encrypted data to be stored in the memory. The encrypted data is based on target data and a first one-time-pad (OTP). In response to an OTP update event indicating that the first OTP is to be updated to a second OTP different from the first OTP, the memory security circuitry generates a re-encryption value based on the first OTP and the second OTP, and the memory security circuitry to issues a re-encryption request to cause updated encrypted data to be generated in a downstream component based on the encrypted data and the re-encryption value and to cause the encrypted data to be replaced in the memory by the updated encrypted data.

18 Claims, 11 Drawing Sheets

US 11,658,808 B2

RE-ENCRYPTION FOLLOWING AN OTP UPDATE EVENT

BACKGROUND

Technical Field

The present technique relates to the field of data processing.

Technical Background

In data processing systems, some data may be encrypted using a unique value known as a one-time-pad (OTP), before being stored in memory. Following encryption, various events may take place which may trigger re-encryption of the encrypted data using an updated version of the OTP. It would be desirable to improve the efficiency of re-encrypting the data.

SUMMARY

Viewed from one example, the present technique provides an apparatus comprising:
memory control circuitry configured to control access to data stored in memory; and
memory security circuitry configured to generate encrypted data to be stored in the memory, the encrypted data being based on target data and a first one-time-pad (OTP);
wherein, in response to an OTP update event indicating that the first OTP is to be updated to a second OTP different to the first OTP, the memory security circuitry is configured to generate a re-encryption value based on the first OTP and the second OTP, and the memory security circuitry is configured to issue a re-encryption request to cause updated encrypted data to be generated in a downstream component based on the encrypted data and the re-encryption value and to cause the encrypted data to be replaced in the memory by the updated encrypted data.

Viewed from another example, the present technique provides an apparatus comprising:
means for generating encrypted data to be stored in memory, the encrypted data being based on target data and a first one-time-pad (OTP);
means for generating a re-encryption value based on the first OTP and the second OTP, in response to an OTP update event indicating that the first OTP is to be updated to a second OTP different to the first OTP; and
means for issuing a re-encryption request to cause updated encrypted data to be generated in a downstream component based on the encrypted data and the re-encryption value and to cause the encrypted data to be replaced in the memory by the updated encrypted data.

Viewed from another example, the present technique provides a method comprising:
generating encrypted data to be stored in memory, the encrypted data being based on target data and a first one-time-pad (OTP); and
in response to an OTP update event indicating that the first OTP is to be updated to a second OTP different to the first OTP, generating a re-encryption value based on the first OTP and the second OTP, and issuing a re-encryption request to cause updated encrypted data to be generated in a downstream component based on the encrypted data and the re-encryption value and to cause the encrypted data to be replaced in the memory by the updated encrypted data.

Viewed from another example, the present technique provides a non-transitory storage medium storing computer program instructions configured to cause a computer to perform a method as described above.

Further aspects, features and advantages of the present technique will be apparent from the following description of examples, which is to be read in conjunction with the accompanying drawings.

DESCRIPTION OF EXAMPLES

Figure 1:
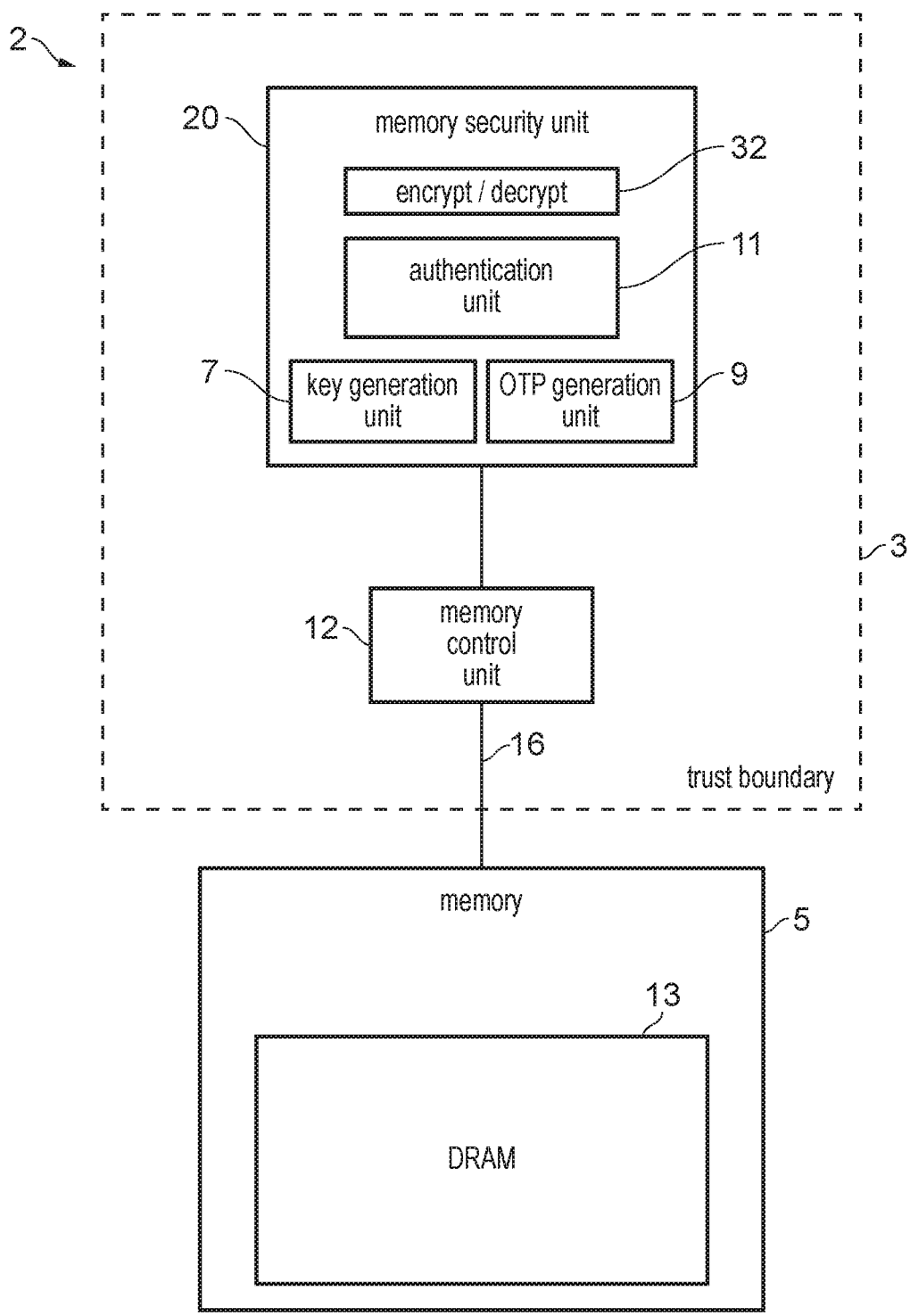
FIG. 1 schematically illustrates an apparatus for storing encrypted data in memory.

In a data processing system, target data may be encrypted by memory security circuitry in dependence on a first one-time-pad (OTP), and the encrypted data may be stored in memory under the control of memory control circuitry, which controls access to data stored in memory. At times, an OTP update event may occur, which indicates that the first OTP used to encrypt the encrypted data is to be replaced by a second OTP different to the first OTP, and that the encrypted data thus should be re-encrypted using the second OTP.

There are a number of ways to carry out the re-encryption of the encrypted data. For example, the encrypted data may be read from memory, decrypted using the first OTP, and then re-encrypted using the second OTP. This allows the encrypted data to be re-encrypted according to the second OTP. However, this approach is costly in terms of processing time and power—it takes time and power to perform the multiple accesses to memory required to read the encrypted data from memory and subsequently write the re-encrypted data back to memory.

In examples of the present technique, an alternative approach is proposed. In response to the OTP update event, the present technique involves the memory security circuitry generating a re-encryption value based on both the first OTP and the second OTP, and issuing a request to cause the encrypted data to be re-encrypted in a downstream component based on the re-encryption key. The re-encrypted data is then stored to memory, replacing the original encrypted data. In this way, since the encrypted data does not have to be returned to the memory security circuitry to be re-encrypted, the communication latency between the memory security circuitry and the downstream component is reduced, since the latency of two transactions for reading the data from memory and writing the re-encrypted data back to memory is replaced with a single transaction latency in transferring the re-encryption value to the downstream component. This also has the advantage of freeing up bandwidth between the memory security circuitry and the downstream component, which can be used instead for other memory accesses, accelerating those accesses. Thus, the overall performance of the system is improved.

The request issued to cause the data to be re-encrypted may be the re-encryption value itself, or it may be a specific re-encryption request, with the re-encryption value being transmitted to the downstream component in addition to the request. The downstream component may be any component further downstream in the memory system (e.g. closer to the memory itself) than the memory security circuitry. The first and second OTPs may be any values which can be used to encrypt the target data. In particular, the OTPs may be generated such that they are unique (one-time, or varying from encryption event to encryption event), thus reducing the likelihood that an attacker could learn how to decrypt arbitrary data (by learning how an attacker-controlled plaintext value stored at a given location is mapped to encrypted data, which might be a risk in systems not using a changing OTP). Using a OTP also provides a counter-measure against replay attacks in which a value observed at one time is supplied by an attacker at a later time.

In some examples, the first OTP is dependent on first values of a key and a nonce at a time of encrypting the data, and the second OTP is dependent on second values of the key and the nonce obtained in response to the OTP update event. The memory security circuitry is configured to generate the re-encryption value based on the first values of the key and the nonce and the second values of the key and the nonce.

The key may be an encryption key generated according to any applicable technique. The nonce can be any value, and is used to make the OTP unique, protecting it against re-use attacks. For example, the nonce may be known, while the key may be secret. Thus, the combination of the nonce and the key used to generate the OTP will be secret and unique. An OTP update event, therefore, may be an indication that either of the key, nonce or both are to be replaced with updated values.

In some examples, the OTP update event comprises an indication that a predetermined period has passed since a previous key update event for updating the key.

In some systems, the key may be updated periodically or at predetermined intervals, and whenever the key is updated, any data encrypted using the key may need to be re-encrypted. For example, to guard against replay attacks, a different OTP may be used on each write to the same address (for example, by updating the nonce each time). However, if an attacker triggers a significant number of writes to that address, this may lead to the same OTP being used again, for example due to the limited number of bits in a nonce used to provide freshness of the OTP. Thus, by replacing the key after a predetermined period, provided that that period is shorter than the minimum period within which the attacker can force the same OTP to be used again (given an expected maximum frequency with which writes to a given memory location can be requested), the uniqueness of the OTP can be maintained. Also, the key may be regularly updated so that if an attacker discovers the key, it is likely that a new key will be in use before the attacker can make use of the key. The predetermined period may be specified as a predetermined period of time, a predetermined number of clock cycle, a predetermined number of accesses to the target data in memory, or a predetermined number of writes of the target data to memory, for example.

In some examples, the nonce comprises a counter, and the memory security circuitry is configured to increment the counter in response to a write to the address in memory associated with the encrypted data. The combination of nonce and key therefore remains unique as long as the counter remains unique. Once the counter reaches its maximum value, a counter overflow event occurs, causing the counter value to wrap between its highest positive value back and its lowest negative value or zero, such that the key/nonce combination is no longer unique. In such examples, the key may be updated in response to counter overflow to ensure that the OTP remains unique. Hence, the OTP update event comprises a counter overflow event associated with the counter.

In some examples, the counter comprises a split counter comprising a combination of a major counter shared between a plurality of data blocks including the target data and at least one other data block, and a respective minor counter specified separately for each data block in the plurality of data blocks. The OTP update event may be a major counter overflow event indicating that the major counter has overflowed. Alternatively, the OTP update event may be a minor counter overflow event indicating that a minor counter associated with a given block of data among the at least one other block (e.g. not the target data block for which the re-encryption is carried out) has overflowed.

In some examples, in response to the minor counter overflow event, the memory security circuitry is configured to increment the major counter and to issue the re-encryption request for the plurality of data blocks other than said given data block. It is not necessary to re-encrypt the given data block itself, as the overflow of the minor counter for the given data block may have been detected when performing the original encryption of the written data for the given data block (which may not yet have been written to memory), so that there is no need for data previously stored in memory to be re-encrypted for the given data block—the new value of the major counter may already have been factored into the original encryption of the newly written data for the given data block.

In response to the major counter overflow event, the memory security circuitry is configured to update the key and to issue the re-encryption request for data blocks encrypted using the previous value of the key. Again, it may not be necessary for the given data block whose write caused the major counter overflow to be re-encrypted if the major counter overflow and key update is detected before the written data for the given data block has been passed to memory—again the new key may be factored into the original encryption of the given data block.

Following the minor counter overflow event, once the major counter has been incremented, all other minor counters associated with the major counter may be re-set. The nonces for all associated data blocks are thus updated (since the count value used in the nonce is formed of both the major and minor count values) and the OTP is therefore updated. As noted above, the data block that caused the minor counter to overflow (by being written to memory) will be encrypted using the new counter values before being written to memory; thus, this data block causing the counter overflow event does not need to be re-encrypted using the re-encryption value.

Following the major counter overflow event, the major counter returns to a previous value (for example, it may be reset to zero). Thus, a new key needs to be generated in order to ensure the uniqueness of the OTP. This may lead to data blocks which do not share the major counter, but do share the key being re-encrypted. Thus, both a minor counter overflow event and a major counter overflow event may lead to an OTP update event, but the major counter overflow may lead to a larger number of data blocks being re-encrypted than the minor counter overflow, as the major counter overflow also affects data blocks that do not share the major counter but do share the key.

In some examples, the downstream component comprises at least one of the memory, a memory controller for controlling access to the memory, at least one dynamic random access memory (DRAM) unit, and a controller associated with a three-dimensional integrated circuit comprising a plurality of memory storage integrated circuit layers.

The downstream component according to any of these examples is a component further downstream (e.g. closer to memory) than the memory security circuitry. Thus, performing the re-encryption in the downstream component allows the data to be re-encrypted without the encrypted data being transmitted all the way to the memory security circuitry. This, therefore, improves the efficiency of the system by reducing the latency and memory bandwidth required to ensure that the encrypted data is replaced with the re-encrypted data based on the updated OTP.

In some examples, the memory security circuitry is configured to be within a trust boundary of the apparatus, wherein data stored outside the trust boundary is accessible to external agents, and the memory security circuitry is configured to issue the re-encryption request beyond the trust boundary to cause the updated encrypted data to be generated outside the trust boundary.

Data stored outside of the trust boundary may be encrypted so that, if an outside agent does access the encrypted data, they may not be able to decrypt it without the OTP, which is typically stored inside the trust boundary. Therefore, it may be considered counter-intuitive to cause the updated encrypted data to be generated outside of the trust boundary, since one would think that performing the re-encryption outside the trust boundary might expose information to external agents that could be of value for an attacker. However, the inventors realised that exposing the re-encryption value does not provide external agents with any more information than would be obtainable from comparing the encrypted data with the updated re-encrypted data, and thus does not reduce the security of the system. Moreover, the inventors realised that it is possible to combine the first and second OTPs to form the re-encryption value such that neither the underlying unencrypted (plaintext) data nor either the first OTP or the second OTP individually can be derived from the re-encryption value or from the updated encrypted data; thus, the plaintexts and both OTPs remain protected—an attacker with access to the encrypted data, the updated encrypted data and the re-encryption value would still not have the information required to decrypt the encrypted data or the updated encrypted data.

In some examples, the memory security circuitry is configured to generate the encrypted data by applying an exclusive-OR function to the target data and the first OTP. The memory security circuitry is configured to generate the re-encryption value by applying an exclusive-OR function to the first OTP and the second OTP, and the re-encryption request comprises a request to cause the updated encrypted data to be generated in the downstream component by applying an exclusive-OR function to the re-encryption value and the encrypted data.

An exclusive OR (XOR) function is associative, which means that XOR-ing the first and second OTPs together to generate the re-encryption value before XOR-ing the re-encryption value with the encrypted data produces the same result as decrypting the encrypted data by XOR-ing it with the first OTP and then re-encrypting it by XOR-ing it with the second OTP. Thus, an XOR function is a particularly advantageous way to combine and apply the OTPs in accordance with the present technique. Moreover, using an XOR function to re-encrypt the encrypted data allows the re-encryption to be carried out without exposing the unencrypted data to any malicious agents able to access the downstream component. Also, by calculating the re-encryption value by XOR-ing the first and second OTPs, neither OTP can be derived from the re-encryption values.

In some examples, following the re-encryption request, the updated encrypted data is decryptable based on the second OTP independently of the first OTP. In other words, despite using both OTPs to re-encrypt the data, only the second OTP is subsequently required to decrypt the data. Re-encrypting the data using the re-encryption value thus has the same effect as decrypting the data using the first OTP and re-encrypting it using the second OTP.

In some examples, the memory security circuitry is configured to generate an authentication code to be stored in the memory, generation of the authentication code comprising applying a hash function to the target data. At a time of reading data from an address associated with the target data in the memory, the memory security circuitry is configured to compare the authentication code with a result of decrypting the read data and applying the hash function to the decrypted data.

This allows the integrity of the data to be checked on reading of the data. Thus, if the data has been altered by an external agent since the generation of the authentication code, this will be detected.

In some examples, in the generation of the authentication code, the hash function is applied to a value which the target data has prior to encryption based on the first OTP. That is, the hash function may be applied to a plaintext data value, where a plaintext data value is an unencrypted data value.

Generating the authentication code based on the unencrypted data value avoids the need for the authentication code to be regenerated when the data is re-encrypted using a different OTP. This, therefore, avoids the need for the re-encrypted data to be read from memory and used to generate an updated authentication key (otherwise, transferring the encrypted data to the memory security unit for the purpose of re-generating the authentication key would counteract the advantage gained from avoiding the transfer of the encrypted data to the memory security unit achieved by using the re-encryption approach discussed above).

In some examples, the authentication code itself may also be protected by an authentication OTP. In particular, the generation of the authentication code may comprise applying an operation to a first value dependent on a hash value obtained by applying the hash function to the target data, and a second value dependent on an authentication OTP, the authentication OTP being independent of the target data. The authentication OTP could be the same as the OTP used for the corresponding data, or could be a different OTP.

In this way, if the authentication OTP is updated for some reason, only the second value needs to be updated.

In some examples, the operation and an inverse of the operation each comprise an associative operation.

In some examples, the first value depends on a first key, and the authentication OTP depends on a second key.

In some examples, in response to an authentication update event indicating that the authentication OTP is to be replaced by an updated authentication OTP different to the authentication OTP, the memory security circuitry is configured to generate an authentication re-calculation value based on the authentication OTP and the updated authentication OTP. The memory security circuitry is then configured to issue an authentication re-calculation request to cause an updated authentication code to be generated in the downstream component based on the authentication code and the re-calculation value and to cause the authentication code to be replaced in memory by the updated authentication code.

These features are useful because they allow the authentication code to be updated in memory according to a similar approach to that described for re-encrypting the target data in accordance with the present technique, so that latency and bandwidth requirements can also be reduced when updating the authentication code.

In some examples, the authentication OTP is dependent on an authentication key and an authentication nonce, and the authentication update event comprises at least one of: an event indicating that the authentication key is to be replaced by an updated authentication key different to the authentication key; and an event indicating that the authentication nonce is to be replaced by an updated authentication nonce different to the authentication nonce.

Nevertheless, in other examples, the authentication code may be re-generated in a different manner. For example, although the data itself may be re-encrypted by sending the re-encryption request as discussed above, other examples may use an authentication code calculation function which means that re-generating the authentication code to match the re-encrypted data requires reading out the old authentication code and re-calculating the authentication code at the memory security unit, and then writing back the updated authentication code to memory. Such an approach would still have a latency and bandwidth advantage over the alternative approach of reading both the encrypted data and the authentication code for memory, as in some cases the authentication code for a given block of data may have fewer bits than the corresponding block of data itself, so authentication codes for a number of data blocks may be packed into the same cache line. Hence, even if the authentication code updates involve reading the old authentication codes to the memory security unit because the old value is needed to be able to generate the updated authentication code to match re-encrypted data, there can still be a significant bandwidth/latency saving in at least avoiding the need to read in all the previously encrypted data to the memory security unit, even if the same benefit is not achieved for the authentication codes.

On the other hand, even further latency/bandwidth savings are possible if the re-encryption approach discussed above is also used for the authentication code re-calculation as discussed in the examples described earlier.

Particular embodiments will now be described with reference to the figures.

FIG. 1 illustrates an example of a data processing system 2 comprising a memory security unit 20 and a memory controller within a trust boundary 3 of the information processing system and a memory 5 outside of the trust boundary 3. The trust boundary 3 indicates the edge of a region of the processing system 2 that is subject to a given level of protection from external agents. For example, the trust boundary 3 may surround a number of components in a system-on-chip (SoC), within which accesses to stored data may be difficult to tamper with by an attacker. Data passing beyond the edge of the trust boundary 3 (e.g. data being stored in memory 5) may therefore be vulnerable to attack by intercepting data on the physical channel 16 between the memory controller (memory control circuitry) 12 and the external memory (e.g. off-chip memory) 5. In some examples, the trust boundary 3 may not be the edge of a SoC, but could instead be a boundary between different integrated circuit (IC) layers in a stack of ICs, for example.

The memory security unit 20 is provided for protecting data stored in the external memory 5, which may include a DRAM unit 13, from a malicious adversary who has physical access to the system and the ability to observe and/or replay the data or code being exchanged between the microprocessor and the memory 5. The memory security unit 20 includes encryption/decryption circuitry 32 for encrypting data being written to the memory 5 and decrypting data read back from the memory 5. This provides privacy by preventing a malicious observer from seeing in the clear the data being read from or stored onto the memory 5. Encryption keys used by the encryption and decryption are generated in a key generation unit 7 and stored in a storage unit within the trust boundary 3 or within the memory security unit 20 itself. The memory security unit 20 also includes an OTP generation unit 9 which uses an encryption key and a nonce, which may include a counter value read from memory 5, to generate a one-time-pad (OTP) to encrypt the data. The OTP is passed to the encryption/decryption circuitry 32, which uses it to encrypt or decrypt the data. It will be appreciated that, although the encryption/decryption circuitry 32, the key generation unit 7 and the OTP generation unit 9 are shown in FIG. 1 as separate components within the memory security unit 20, it is also possible the encryption/decryption circuitry 32, key generation unit 7 and OTP generation unit 9 are implemented as logic within a single component.

The memory security unit 20 also includes an authentication unit 11, for generating authentication codes (such as message authentication codes (MACs)) for data to be stored in memory 3. The authentication codes are based on the data, and may be stored in memory 3 along with the data. When reading the data from memory, the read data is used to generate a new authentication code, which is compared with the authentication code generated at the time the data was stored. If the new code and the original code are the same, it is determined that the data has not been tampered with since being stored.

In order to ensure that encrypted data stored in the memory 5 remains protected, it is sometimes appropriate to update the encryption key used to encrypt the data. For example, if there is a chance that the key has been discovered, or if sufficient time has passed that an attacker could have triggered enough writes to memory to cause the OTP to be reused, or if a counter upon which the nonce is based overflows (such that the OTP generated from the nonce and the key is no longer unique (one-time) because the counter has returned to a previous value), or on explicit instruction from a processing element within the trust boundary, the key may be replaced. In some systems, the key is replaced at predetermined intervals. For example, following a predetermined interval of time, a predetermined number of clock cycles, or a predetermined number of accesses to data in the memory 5, since the last time the key was replaced.

In any case, when it is determined that an encryption key will be replaced, an OTP update event is triggered. A new key is generated by the key generation unit 7, and the nonce may be reset. The OTP update unit may generate a new OTP based on the new key and the latest value of the nonce. Once a new OTP is generated, data in memory 5 that has been encrypted according to the old OTP will need to be re-encrypted using the new OTP, such that it can later be decrypted based on the new OTP. One way of re-encrypting the encrypted data could be for the memory security unit 20 to issue a request to the memory control unit 12 to read the encrypted data from memory 5 via the physical channel 16. The encrypted data can then be decrypted in the encryption/decryption circuitry 32 using the old OTP and then re-encrypted using the new OTP. The re-encrypted data can then be stored back in memory 5 by the memory controller 12. This ensures that the encrypted data is updated based on the new encryption key. However, the multiple accesses to memory 5 that are required (reading the encrypted data from memory 5 and then writing the re-encrypted data back to memory 5) consume a significant amount of power and take a significant amount of time and bandwidth to be carried out. Thus, it is desirable to find a more time and energy efficient method of re-encrypting the data.

According to the present technique, once the new OTP has been generated by the OTP generation unit 9, a re-encryption value is generated using both the old OTP and the new OTP. This could, for example, be carried out in the OTP generation unit 9, or in the encryption/decryption circuitry 32. Once the re-encryption value has been generated, the memory security unit 20 is configured to issue a request—including the re-encryption value—to the memory control unit 12, requesting the encrypted data to be re-encrypted in memory 5 (for example, in the DRAM unit 13) using the re-encryption value. The request issued by the memory security circuitry 20 also triggers the encrypted data to be replaced in the memory 5 with the re-encrypted data.

In this way, the encrypted data is re-encrypted in memory 5, without needing to be read from memory and written back to memory following the re-encryption. Thus, energy and time are saved by avoiding these additional accesses to memory 5, improving the overall time and energy efficiency of the processing system 2.

In some examples, the re-encryption of the encrypted data does not take place in the memory 5 itself, but takes place in some other component that is downstream from (closer to the memory 5 than) the memory security unit 20. For example, the re-encryption could take place in the memory control unit 12. In this case, although the encrypted data still needs to be retrieved from memory 5, there are still energy and time savings since the data does not have to be transferred all the way to the memory security unit 20.

Figures 2A, 2B:
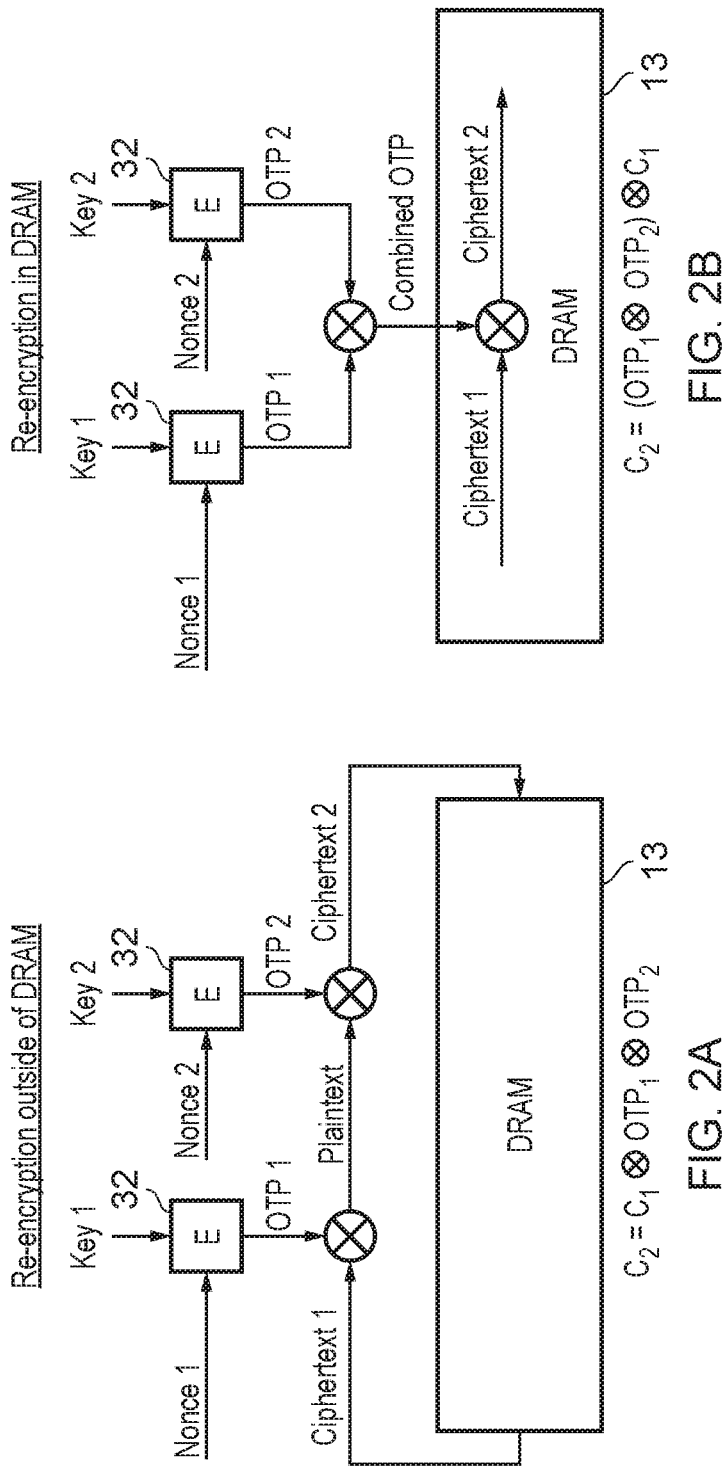
FIG. 2A schematically illustrates re-encryption of encrypted data outside of a memory component.
FIG. 2B schematically illustrates re-encryption of encrypted data inside a memory component.

FIGS. 2A and 2B compare re-encryption of encrypted data according to the first method described above—where the data is read, decrypted using the first OTP and then re-encrypted using the second OTP—and the method of the present technique. In both FIG. 2A and FIG. 2B, it is assumed that data has previously been encrypted by applying an XOR function (denoted $\oplus$) to an OTP and the data. Thus, the encrypted data (ciphertext1) is generated using the first OTP (OTP1) as:

$$\text{Ciphertext1} = \text{Plaintext} \oplus \text{OTP1} \tag{1}$$

The inverse of the XOR function is itself, so the encrypted data (Ciphertext1) can thus be decrypted by applying the XOR function to the encrypted data and the first OTP:

$$\text{Plaintext} = \text{Ciphertext1} \oplus \text{OTP1} \tag{2}$$

FIG. 2A illustrates a first method of re-encryption of encrypted data stored in a DRAM, following an OTP update event triggering the key or the nonce to be updated. In FIG. 2A, the first OTP is generated by the encryption/decryption circuitry 32 using first values of the key and the nonce, and the second OTP is generated by the encryption/decryption circuitry 32 using second values of the key and the nonce (it will be appreciated that in some cases one of the key and nonce may have remained the same, with the other changing—it is possible for either Nonce 1=Nonce 2 or Key 1=Key 2, provided at least one of the key and nonce has changed). The encrypted data (e.g. ciphertext) is read from the DRAM 13 and decrypted using the first OTP. The method used to decrypt the encrypted data depends on the method that was used to encrypt the data, but in the example of FIG. 2A the ciphertext is decrypted by applying an exclusive-OR (XOR) function to the ciphertext and the first OTP.

Once the ciphertext has been decrypted, the decrypted value is re-encrypted using the second OTP. Again, the exact technique used to encrypt the data may vary, but in this example the data is re-encrypted by applying an XOR function to the data and the second OTP. Therefore, overall, the operations applied to the encrypted data to re-encrypt it, once it has been read from memory can be represented as:

$$\text{Ciphertext2} = \text{Plaintext} \oplus \text{OTP2} = (\text{Ciphertext1} \oplus \text{OTP1}) \oplus \text{OTP2} \tag{3}$$

Finally, the re-encrypted data is written back to the DRAM 13.

As discussed above, this approach to re-encrypting data uses a significant amount of energy and takes a relatively long time, largely due to the multiple accesses to memory that are required.

FIG. 2B illustrates re-encryption of encrypted data in the DRAM 13, in accordance with examples of the present technique. Like in FIG. 2A, the first OTP is generated by the encryption/decryption circuitry 32 using first values of the key and the nonce, and the second OTP is generated by the encryption/decryption circuitry 32 using second values of the key and the nonce. Again, for at least one of the key and the nonce, the second value may be different from the first value, but it is not essential for both the key and the nonce to have changed. The first and second OTPs and then combined to form a re-encryption value (combined OTP). This combined OTP may be formed in any of a number of ways, but in this example, where the ciphertext has been encrypted by applying an XOR function to the target data (the data to be encrypted) and the first OTP, the combined OTP is generated by applying an XOR function to the first and second OTPs:

$$\text{Combined OTP} = \text{OTP1} \oplus \text{OTP2} \tag{4}$$

The combined OTP can then be used to re-encrypt the encrypted data:

$$\text{Ciphertext2} = \text{Ciphertext1} \oplus (\text{OTP1} \oplus \text{OTP2}) \tag{5}$$

This is possible because the XOR function is associative. Therefore, mathematically, the same result is obtained regardless of which part of the calculation is carried out first (e.g. it doesn't matter if the OTPs are XOR-ed together first or if the ciphertext is XOR-ed with OTP1 first).

Because this technique does not require the data to be decrypted into plaintext (unencrypted) data, it is relatively safe for this to be carried out within a component that is downstream from the memory controller, even if that component is outside of a trust boundary. For example, the re-encryption of the encrypted data using the combined OTP could be carried out within the row buffer of a DRAM 13. Therefore, the re-encryption of the ciphertext can be carried out without making multiple accesses to memory; this can lead to significant savings in power and time.

Furthermore, although the combination of the first and second OTPs is exposed to potential attackers according to this technique, the inventors realised that this information was already derivable from encrypted data (ciphertext1) and the updated encrypted data (ciphertext2)—an attacker could easily obtain the combined OTP by XOR-ing ciphertext1 with ciphertext2. The inventors also realised that, even if the attacker were to obtain the combined OTP, they would not be able to obtain the first and second OTPs from it. Thus, the OTPs (and the original unencrypted data) are kept secure even though the re-encryption takes place in the DRAM 13.

Figure 3:
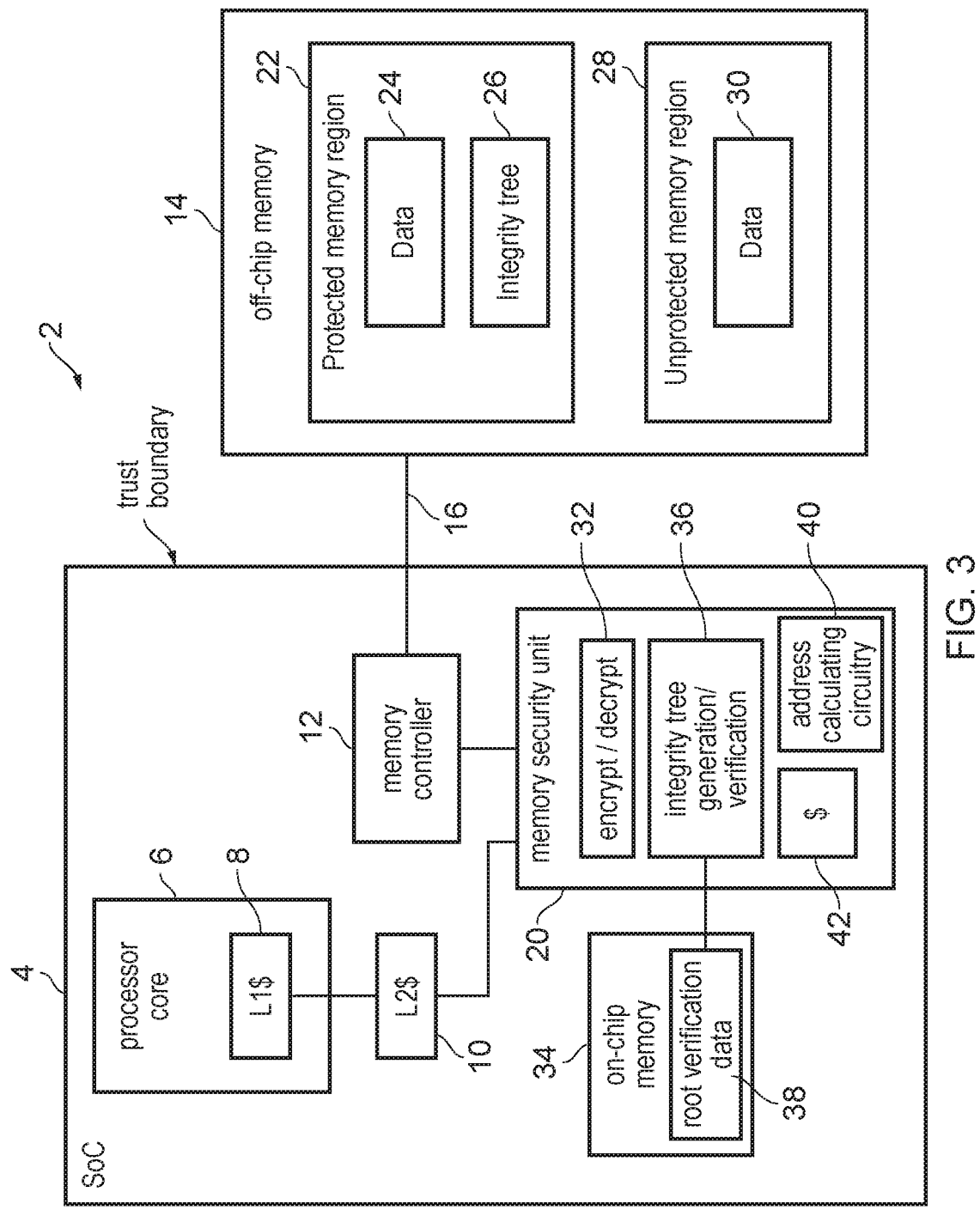
FIG. 3 schematically illustrates a data processing system having a memory security unit for storing encrypted data in off-chip memory.

FIG. 3 schematically illustrates an example of the data processing system 2. The processing system 2 comprises an integrated circuit (IC) or system-on-chip (SoC) 4 which includes at least one processor core 6 for executing program instructions to carry out data processing operations. While FIG. 3 only shows one processor core, in some cases the SoC 4 may comprise multiple processors. Each processor core or processor core cluster may have a cache 8 (or multiple levels of cache 8, 10). A memory controller 12 acts as memory access circuitry for controlling access to an off-chip memory 14 which is on a separate integrated circuit from the system on-chip 4, and is an example of the memory 5 depicted in FIG. 1. While accesses to data on-chip may be difficult to tamper with by an attacker, the edge of the system on-chip may act as a trust boundary and any data passing beyond that boundary may be vulnerable to attack by intercepting data on the physical channel 16 between the memory controller 12 and the off-chip memory 14, or by reading or modifying the data while it is stored in the off-chip memory 14.

It should be noted that, while FIG. 3 shows an example where the trust boundary corresponds to the edge of the system on-chip, in other cases there could be trust boundaries within a system on-chip (or between stacked layers of a three-dimensional integrated circuit) which could expose data beyond the trust boundary to potential attacks.

The system on-chip 4 includes the memory security unit 20 described above with reference to FIG. 1, provided for protecting data stored to a protected memory region 22 of the off-chip memory 14. The protected memory region 22 includes the data 24 to be protected as well as integrity tree metadata 26 used in the verification of the data 24. An unprotected memory region 28 is also provided in the off-chip memory 14, and data 30 stored in the unprotected region is not protected by the memory security unit 20 and so is free to be accessed and modified by an attacker. In some implementations, the mapping of addresses to the protected and unprotected memory regions 22, 28 may be fixed by the hardware, so that it is not possible for an operating system or other software executed by the processor core 6 to vary which addresses are mapped to the protected memory region 22 or unprotected memory region 28. Alternatively, if the software controlling the address mapping can be trusted, the address mapping controlling which addresses are mapped to the protected region or the unprotected region may be varied by the processor under control of software, and so the protected and unprotected regions need not always map to the same physical locations in the off-chip memory 14. In some implementations, there may not be any unprotected memory region 28 provided in the off-chip memory 14—in this case the entire off-chip memory could be considered the protected memory region 22.

The memory security unit 20 includes integrity tree generation and verification circuitry 36, referred to in general as verification circuitry 36 below. The verification circuitry 36 is responsible for maintaining the integrity tree 26 in the protected memory region. The integrity tree may provide a number of pieces of information for verifying whether data currently stored in the protected region 22 is still the same as when it was written to that region. The checking of data integrity can for example be achieved using message authentication codes (MACs) which may be generated from the stored data using one-way cryptographic functions such as AES-GCM or SHA-256, which use functions which make it computationally infeasible for an attacker to guess the authentication code associated with a particular data value by brute force when a secret key used to generate the authentication code is unknown.

The MACs may be based on a hash (H) of the data (D), a nonce (N) and the address (A) to which the data is to be stored. In particular, the MAC may be an encryption of the hash using one or more encryption keys $E_K$. For example, the MAC may be of the form:

$$\text{MAC}=E_K(H(D\|A\|N)) \quad (6)$$

The data (D) may be the encrypted data, but it may instead be the unencrypted (plaintext) data. If plaintext data is used, the MAC does not need to be updated when the encryption key is updated. This avoids the need to read the encrypted data from memory in order to update the MAC, which would undermine the benefits achieved by performing the re-encryption in memory.

The nonce (N) may be based on a counter than is incremented every time data is written to the associated address (A). In this case, when the counter is incremented, meaning that the nonce changes, the hash needs to be recalculated. However, this is not usually a problem, since the data (D) will be updated at the same time, so the MAC would need to be recalculated anyway. However, there are a limited number of circumstances in which the nonce (N) may change without the data (D) or the address (A) changing—for example, if the counter overflows (exceeds its maximum value) and wraps around from its highest positive value to its lowest negative value, or to zero. Therefore, it is useful to generate the MAC from two parts, one of which is based on the nonce (N) and one of which is not:

$$\text{MAC}=E_{K1}(H(D\|A))\oplus E_{K2}(N) \quad (7)$$

By generating the MAC as shown in equation 8, the MAC can be updated in memory without needing to read the MAC or the data. For example, a key-update event may trigger the second key $E_{K2}$ to be updated from a first value $E_{K2a}$ to a second value $E_{K2b}$. A re-encryption value may therefore be generated based on the old and new keys, and the values of the nonce before and after the key-update event ($N_a$ and $N_b$). For example, the re-encryption value may be generated as:

$$\text{Re-encryption value}=E_{K2a}(N_a)\oplus E_{K2b}(N_b) \quad (8)$$

The re-encryption key can then be sent to memory, and used to re-encrypt the MAC according to:

$$\text{Updated MAC}=\text{Re-encryption Value}\oplus \text{Old MAC} \quad (9)$$

Thus, the energy and time that would be needed to update the MAC is reduced, since instead of needing two memory transactions to read the MAC from memory and write it back to memory once it has been updated, the read and write are replaced with a single transaction to send the re-encryption value to memory.

It should be noted that although the updating of the MAC has been described as taking place in memory, it may alternatively take place in any component that is downstream from the memory security unit. For example, it could be carried out in a memory controller 12.

The authentication codes may be stored alongside the data 24 in the protected memory region 22, although they may be stored at a different address in the protected memory region 22 to the data—for example, the authentication codes for multiple addresses may be stored together in a given area of the protected memory region 22. Alternatively, the authentication codes may be stored in a separate data structure altogether. The stored MAC for a data value is checked against a calculated MAC derived from the stored data using the same one-way function used to generate the stored MAC, and if a mismatch is detected between the stored MAC and calculated MAC then this may indicate that the data has been tampered with.

By calculating MACs based on the nonce, this protects against a replay attack where a malicious person with physical access to the system stores a legitimate combination of the encrypted data and the MAC which was observed previously on the bus and then replays these onto the bus later with an intent to corrupt data at a given memory location with stale values so as to compromise the operation of the system, and also protects against the attacker tampering with data stored in the off-chip memory 14 in an attempt to change the data actually stored to the off-chip memory 14 by software on the processor core 6 so that when the software later reads the data, the wrong value is read out.

However, storing all the nonces and MACs on-chip would require a large amount of storage circuitry which may exceed area/power budget for the system-on-chip 4. To reduce the overhead of storing the nonces and MACs, the nonces and MACs may be stored off-chip, but to protect against tampering their authenticity may be verified using an integrity tree 26, which may provide a tree structure of nodes where each leaf node of the tree provides integrity data for verifying that one of the blocks of data 24 in the protected memory region 22 is valid and a parent node of a leaf node provides further integrity data for checking that the leaf node itself is valid. Parent nodes may themselves be checked using further parent nodes of the tree, and this continues as the tree is traversed up to the root of the tree which may then provide the ultimate source of verification. Root verification data 38 stored in the on-chip memory 34 may be used to verify that the root of the tree is authentic, either by storing the root node of the tree itself on on-chip, or by storing other information which enables the root node stored in the protected memory region to be authenticated.

The memory security unit 20 may have address calculating circuitry 40 for calculating the addresses at which the nodes of the integrity tree 26 required for checking particular data blocks are located in the protected memory region 22. Optionally, the memory security unit 20 may also have a cache 42 for caching recently used nodes of the integrity tree for faster access than if they have to be read again from the off-chip memory 14. Alternatively, the memory security unit 20 could have access to one of the caches 10 which may also be used by the processor core 6 and so caching of data from the integrity tree 26 within the shared cache 10 could also help to speed up operation of the memory security unit 20.

Figure 4:
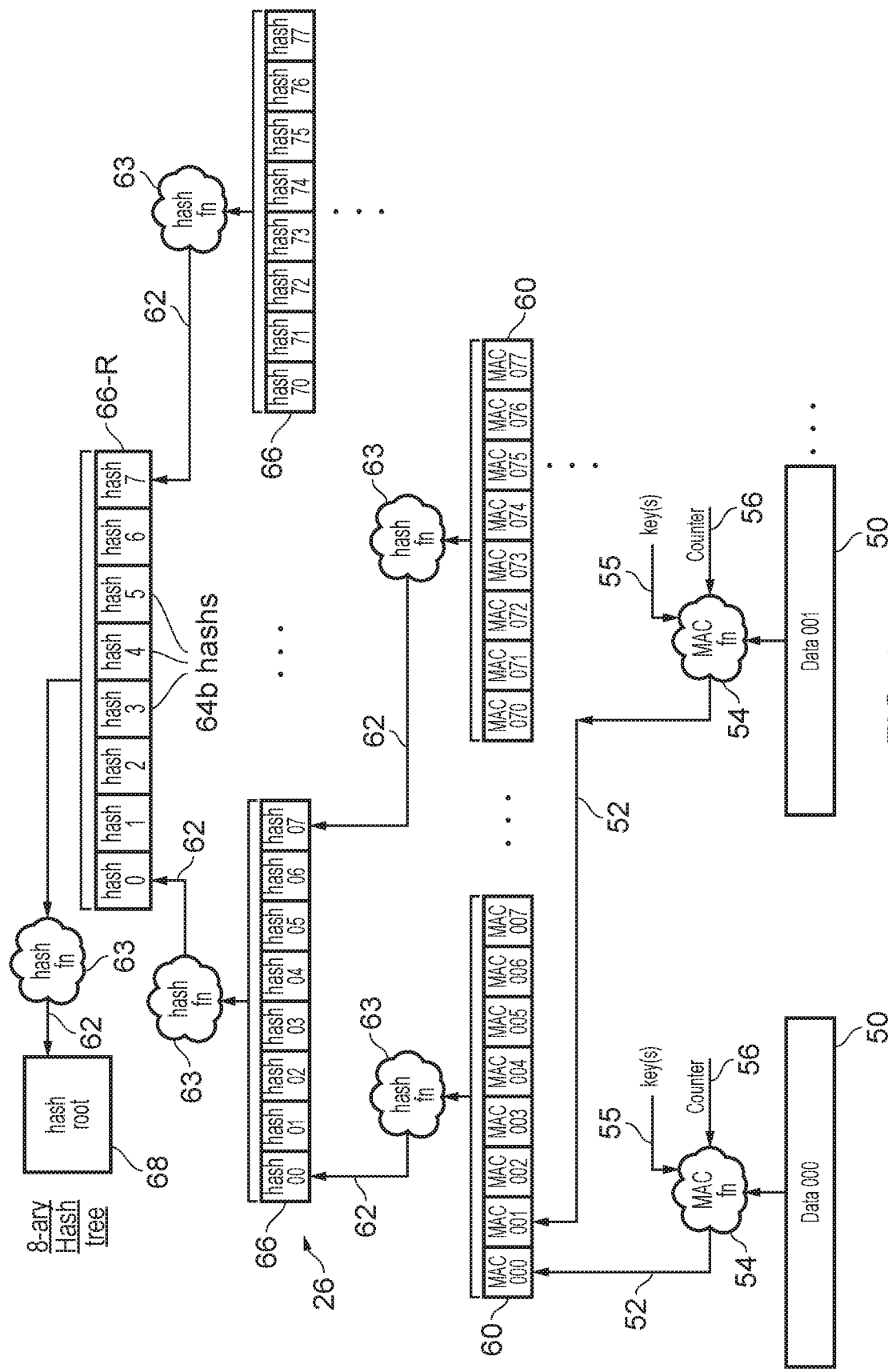
FIG. 4 illustrates an example of a hash tree that can be used to check the integrity of data stored in a protected region of memory.

There are a number of ways in which the integrity tree can be implemented. FIG. 4 shows a first example which implements the integrity tree 26 as a hash tree built up from the hashes for the respective data blocks. The hashes may be un-keyed hashes or they may be MACs, as discussed above, and the hashes may be generated with or without a nonce/counter value. In the example shown in FIG. 4, MACs are used to protect the encrypted data, but for the integrity tree nodes un-keyed hashes are used. By using a MAC formed by encrypting a hash of plaintext data and a nonce, based on two encryption keys ($E_{K1}$, $E_{K2}$) as discussed above, this means the MACs can be re-calculated on a change of nonce or second key ($E_{K2}$) without needing to read out the ciphertext from memory. As shown in FIG. 4, each data block 50 has a corresponding MAC 52 calculated by applying the MAC hash function 54 to the plaintext contents of the data block 50. The nonce provides freshness (variation in the way the MAC is derived from the data and a secret key) so that an attacker is prevented from correlating new and old values stored to the same data block. In this approach the counters (nonces) 56 used for each MAC generation may be stored separate from the hash tree 26 in a separate data structure. The data blocks used to store the counters could themselves be some of the data blocks 50 protected using the MACs. Alternatively, the counters could be stored in the unprotected memory region 28, as tampering with a counter would still be detectable as it would cause the corresponding data block's MAC authentication to fail.

All of the MACs 52 calculated for a certain group of data blocks are gathered together within a leaf node 60 of the integrity tree 26, so that the leaf node specifies the MACs covering a certain range of the address space. The integrity of the leaf node 60 of the tree can then be protected by calculating a hash 62 based on the contents of the leaf node 60, which itself is stored together with hashes from other leaf nodes 60 within a non-leaf node 66 of the integrity tree 26. The hash function 63 used to calculate the hash 62 may be an unkeyed hash which is not encrypted, and may not depend on a counter either. The non-leaf node 66 acts as a parent node of each of the leaf nodes 60 whose hashes are stored in the non-leaf node 66. Hence, each parent node stores hashes 62 for protecting a block of memory equivalent in size to the total memory covered by all of the hashes stored in each of its children nodes. For example, in the case of FIG. 4 the tree is an 8-ary hash tree and so each parent node has eight child nodes and so covers a memory region eight times the size of the memory region covered by one of its children. Similarly, for each non-leaf node a further hash is calculated by applying the same hash function calculation function 63 to the non-leaf node. By continuing to group hashes of child nodes together in a parent node protected by a single hash, eventually the entire protected memory region 22 can be reduced to a root node 66-R which stores the hashes for a number of child nodes which together cover the entire protected memory region 22. The number of levels of the tree required may depend on the size of the protected memory region. The authenticity of the root node 66-R can be verified either by storing the root node itself in the on-chip memory 34 as the root verification data 38, or as shown in FIG. 4 by computing a further hash of the root node and storing that hash 68 as the root verification data 38 in the on-chip memory 34.

Hence, when a data value has to be accessed, the corresponding data block 50 is subjected to the same MAC function 54 that was used to generate its MAC and the result is compared against the MAC stored in a corresponding leaf node 60 of the tree and then the tree is traversed with each successive child node being verified based on the hash 62 obtained from its parent node, until the root node is reached and the root node is also verified. If all of the verifications of each of the nodes on the branch leading from the target data block 50 back to the root node are successful, then the data access is allowed. Each counter 56 is incremented when the corresponding data block is updated (written to), so that the mapping between the data block and its MAC changes over time.

Figure 5:
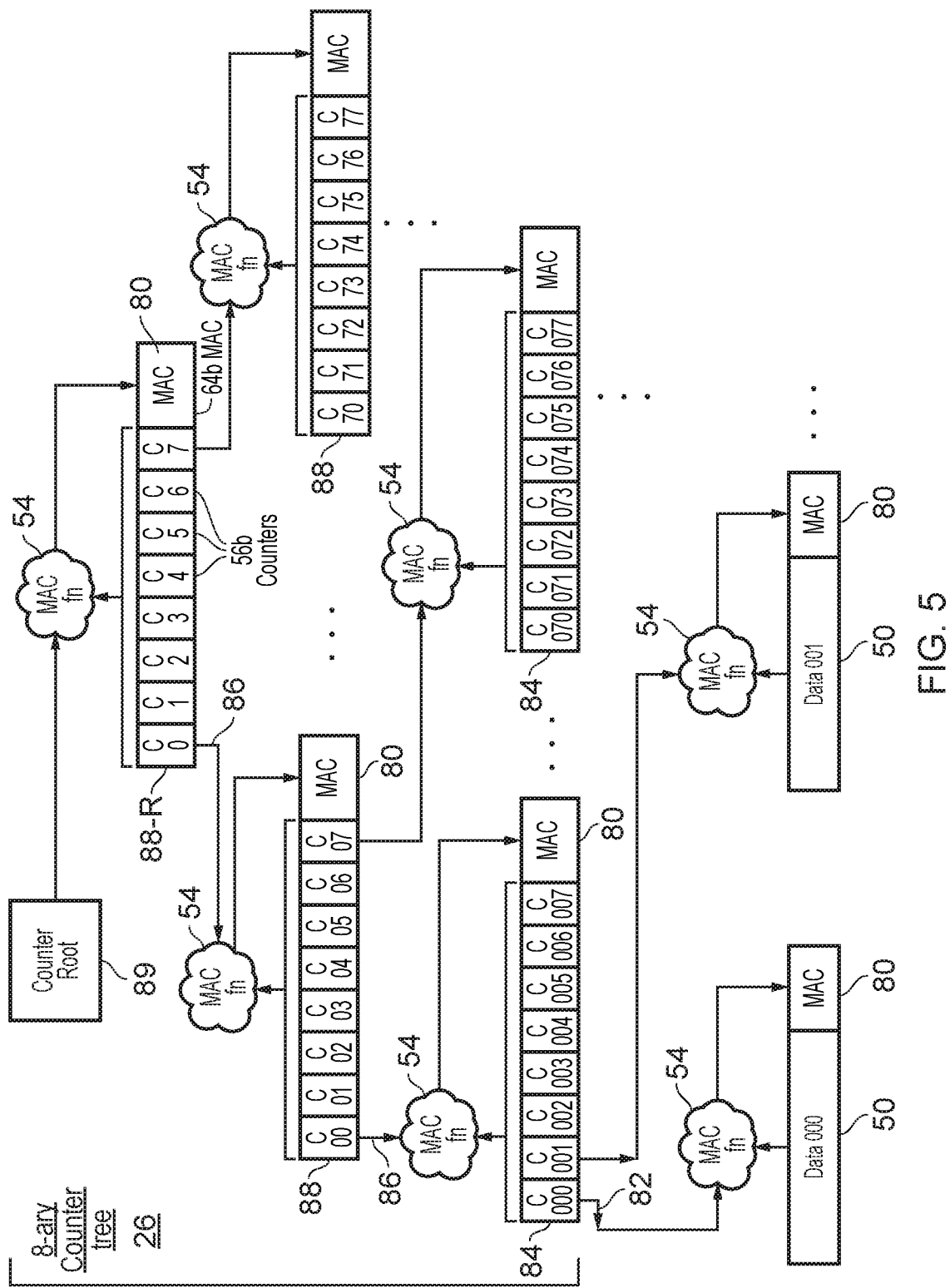
FIG. 5 illustrates an example of a counter integrity tree that can be used to check the integrity of data stored in a protected region of memory.

FIG. 5 shows an alternative way of implementing the integrity tree 26 using a counter tree instead of a hash tree. In this case, rather than a given node of the tree providing all the MACs to be used for authenticating the blocks at a subsequent node of the tree, each node instead defines separate counters for each child node of the current node of the tree. Each data block 50 of the protected memory region 22 which is not part of the integrity tree 26 itself is protected by a MAC 80, which is computed based on the contents of the data block 50 and a counter 82 which is read from a leaf node 84 of the counter integrity tree 26. The leaf node 84 may specify a number of counters each corresponding to different data blocks 50. In this example the MAC 80 calculated for a given data block 50 is stored within the same region of memory as the corresponding data. This is not essential, and in other examples, the MAC could be stored separately from the corresponding data. For each leaf node 84 of the tree a similar MAC 80 is computed based on the contents of the leaf node 84 and a counter 86 read from a non-leaf node 88 which acts as the parent node of the leaf node 84. Each non-leaf node 88 provides the counters used for multiple child nodes 84. Similarly, at each level of the tree, the counter 86 used to compute the MAC 80 for a given child node is read from a data block 88 corresponding to the parent node of that child node, all the way up to the root node 88-R. The address calculating circuitry 40 of the memory security unit 20 identifies, for a given target data block of interest which other data blocks store the required nodes of the integrity tree 26 providing the relevant counters. Eventually, the root node 88-R is reached and the MAC 80 for the root node is computed as a function of the contents of the root node and a root counter 89. The root counter 89 could be stored as the root verification data 38 in the on-chip memory 34. Alternatively, the entire root node 88-R of the tree could be stored in the root verification data in the on-chip memory and in this case there is no need to compute a further MAC for this root node.

In summary, with the counter tree shown in FIG. 5, at each level of the tree the counter cache line's integrity is ensured by using a MAC stored in the same cache line which is calculated using a counter read from a parent node of the tree.

Each counter is incremented or updated each time the corresponding data block is written to. For example, when a data block 50 providing non-integrity tree data is updated, then the corresponding counter within one of the leaf nodes 84 of the tree is incremented. This then requires re-computation of the MAC 80 associated with the leaf node 84, which triggers an increment of the counter in the next highest parent node 88 of the tree and so on all the way back up to the root.

When one of the counters overflows, for example wraps around from the most positive value of the counter to the most negative value or to zero, then one of the previous counter values may be repeated and so there is a risk that replay attacks could become possible. In this case, the memory security unit 20 may update the encryption keys used by the encryption circuitry 32 so that again this will force a different mapping between a particular data value seen in the clear and the MAC generated based on the encrypted data value and the counter. However, such updates to the encryption keys can be expensive, because when the encryption keys change, all of the data in the protected memory region 22 would need to be decrypted using the old keys and re-encrypted using the new keys and then written back to memory. This can be an expensive operation in terms of performance since it may require a large number of reads and writes. To reduce the frequency with which such complete re-encryption of the protected memory region 22 is required, it may be desirable to provide each data block with a counter with a sufficient number of bits to make such overflows rare. For example, in the approach shown in FIG. 5, each 512-bit cache line has 64 bits used for the MAC and this leaves 448 bits for the counters which can be divided into eight counters of 56 bits each. While reducing the size of each counter could allow more counters to fit in one cache line, this will result in more frequent overflows which may impact on performance. Hence, the approach shown in FIG. 5 tends to limit the arity of the tree (an arity of 8 in the example of FIG. 3), which limits how fast the tree can fan out and increases the number of levels required to be traversed in order to have the overall tree cover a certain size of the protected memory region 22.

Figure 6:
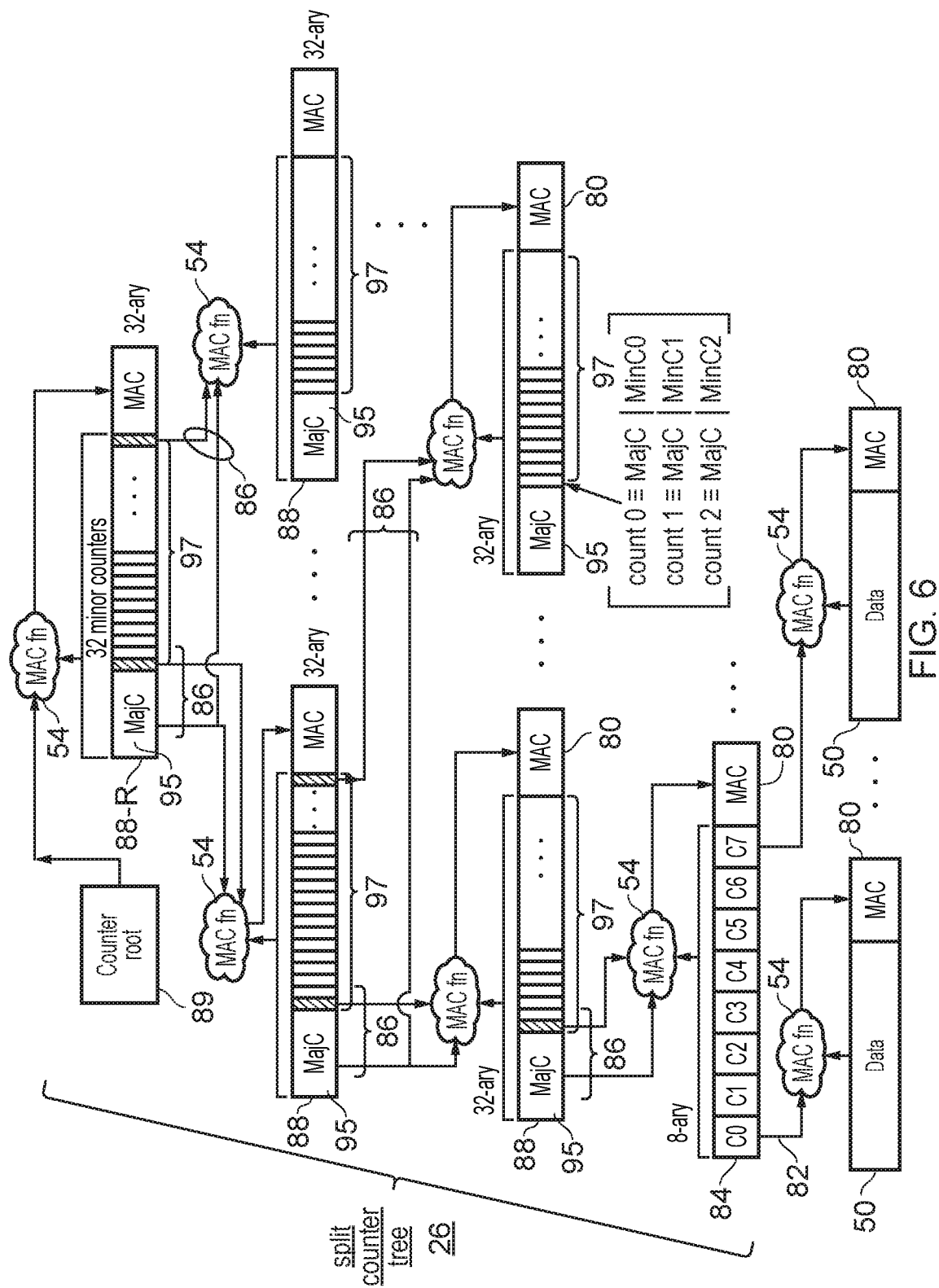
FIG. 6 illustrates an example of a counter integrity tree including split-counters that can be used to check the integrity of data stored in a protected region of memory.

FIG. 6 shows a split-counter integrity tree 26 which can be used by the memory security unit 20 to improve performance relative to the example shown in FIGS. 4 and 5. The counter tree has a similar arrangement of leaf nodes and non-leaf nodes 84, 88 as in FIG. 5 with each parent (non-leaf) node 88 providing the counters for computing the MACs 80 for each of its child nodes and the leaf nodes 84 providing the counters 82 for computing the MACs for other non-integrity tree related data blocks 50. However, in FIG. 6, at least some of the nodes of the tree use a split-counter approach, in which the counters in that node of the tree are represented in split-form using a major count value 95 and a number of minor count values 97. Each of the minor count values 97 corresponds to one of the data blocks covered by that node of the tree. The actual counter for a given data block is defined by the combination of the major count value 95 (which is shared between all of the blocks covered by that node) and the specific minor count value 97 specified for that data block. For example, the counter for block 0 could correspond to the major count value concatenated with the specific minor count value selected for block 0; the counter for block 1 can correspond to the shared major count value concatenated with the specific minor count value selected for block 1; and so on. Hence, when the MAC 80 is calculated for a given block of data, the MAC function 54 is applied to the contents of the data block together with both the shared major counter 95 from the parent node and one of the minor counters 97 selected for the particular data block. Each minor counter 97 is incremented on each update to the corresponding data block. The shared major counter 95 is incremented when any of the corresponding set of minor counters 97 overflows.

By using this split-counter approach, the overall size of counter provided for each data block can still be relatively large, while still having separate counters for each data block, to make it harder for attackers to guess the counter value applied to a given data block. For example, a 512-bit cache line using a 64-bit MAC could be provided with a 64-bit major counter and 32 12-bit minor counters, effectively providing a 76-bit counter for each data block. Hence, the chance of a counter overflow requiring re-encryption of the entire protected memory region can be reduced by providing a total number of bits of the major counter and one minor counter that is sufficiently large.

However, as the number of child nodes which can be covered by one parent node is dependent on the number of minor counters, and the minor counters in the approach shown in FIG. 6 are smaller than the monolithic counters shown in FIG. 5, this means that the arity of the tree can be greatly increased so as to permit, for any given size of cache line, a greater number of child nodes per parent node. In the example of FIG. 6, the arity is 32 for the split-counter nodes of the tree. This means that the fan out of the tree is much greater and so fewer levels are required in order to cover a given amount of memory. As shown with the leaf node 84 of FIG. 6, it is not essential for all the nodes of the tree to use the split-counter approach, for example some could still use the monolithic approach shown in FIG. 3 and so may have a different arity, e.g. eight for the example of FIG. 6. This may be useful if the overall size of the protected memory region does not map to a number of blocks corresponding to an exact power of the arity used in the split counter nodes, in which case some nodes of lower arity may be required.

Figure 7:
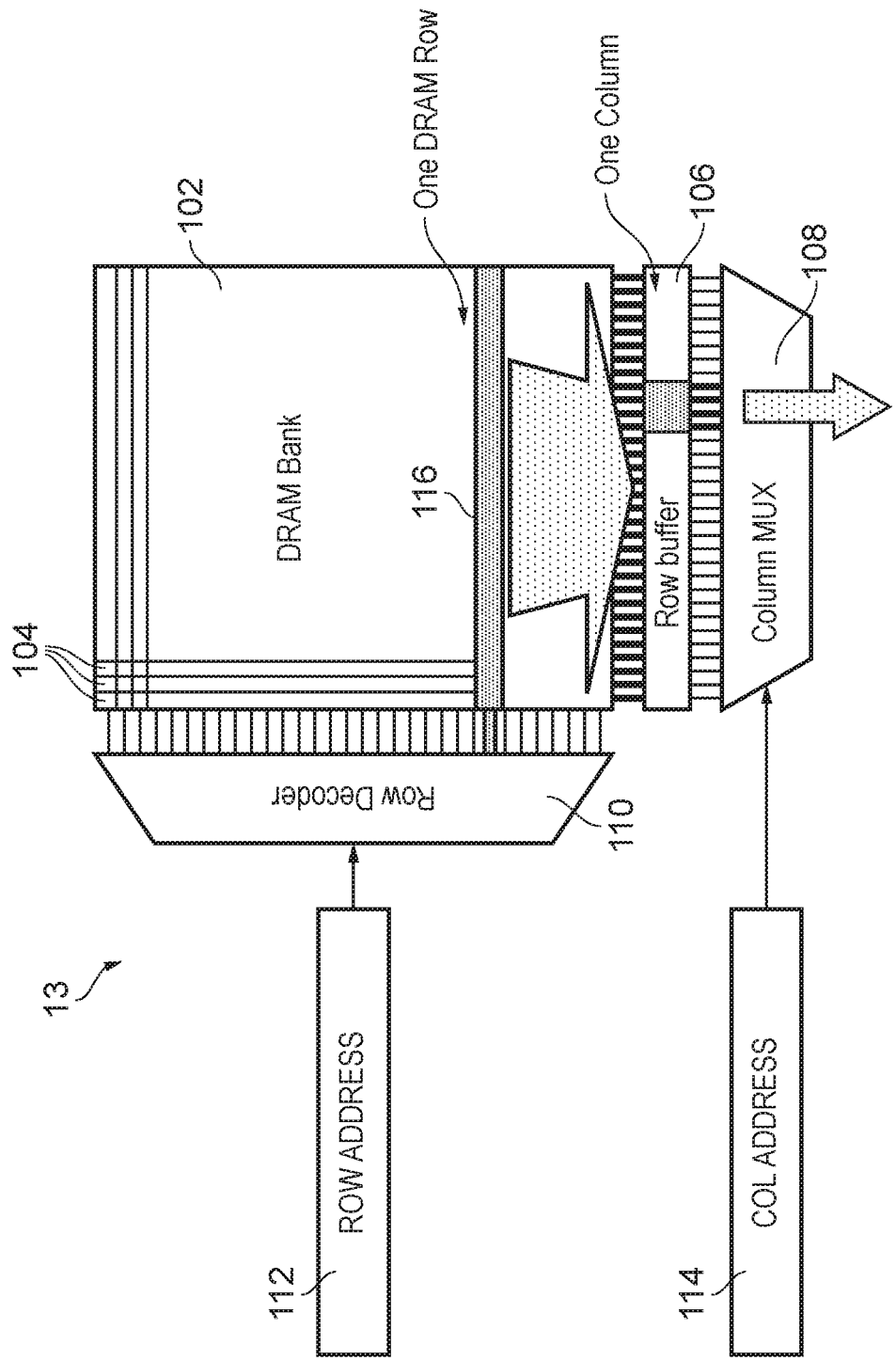
FIG. 7 shows an example of a DRAM memory bank.

As mentioned above, the encrypted data to be re-encrypted following an OTP update event may be stored in a DRAM unit 13. FIG. 7 shows an example of a DRAM-based storage circuit 13. The storage circuit 13 comprises an array 102 of storage locations 104 arranged in rows and columns, a row buffer 106, a column multiplexer 108 and a row decoder 110. For DRAM, each storage location 104 comprises a group of bitcells, each bitcell comprising a capacitor which can be selectively charged or discharged to represent a 1 or 0 corresponding to one bit of the overall value represented by the corresponding storage location 104. Accesses to the DRAM 13 are carried out in two stages. First, an activation command specifying a row address 112 is issued. The row decoder 110 activates the corresponding row 116, to bring the information stored in each of the storage locations 104 of the corresponding row into the row buffer 106. Second, a column address 114 accompanies the actual read/write command, which controls the column multiplexer 108 to select an entry of the row buffer 106 corresponding to the specified column within the active row, and either output the information read from that entry as read data or update the data in that entry based on write data provided with the write command. For a write, as the connection between the sense amplifiers forming the row buffer 106 and the corresponding DRAM storage location 104 may be left open, writes to the row buffer 106 may be propagated back to the corresponding storage location 104 as well. Multiple read/write operations may be performed within the same active row, before the row is closed using a precharge command which closes the connection between the row buffer 106 and the active row 116, ensures that the storage locations of the active row 116 have been updated to reflect any writes to the row buffer 106, and resets the row buffer 106 ready for another row to be selected as the active row.

Within the row buffer (106), data can be edited before being written back to its associated memory location 104. It is also possible to build a DRAM to include circuit logic to perform some simple bit-wise calculations (such as XOR operations) that may be performed within the row buffer. For example, it may be possible to perform the operation shown in equation 5, in which an XOR function is applied to the encrypted data stored in the DRAM 13 and the combined OTP, in the row buffer 106. Thus, the re-encryption of the encrypted data can be carried out in the DRAM unit 13, avoiding the need for the data to be read from the DRAM bank 13 and re-written to the DRAM bank 13 following re-encryption.

Figure 8:
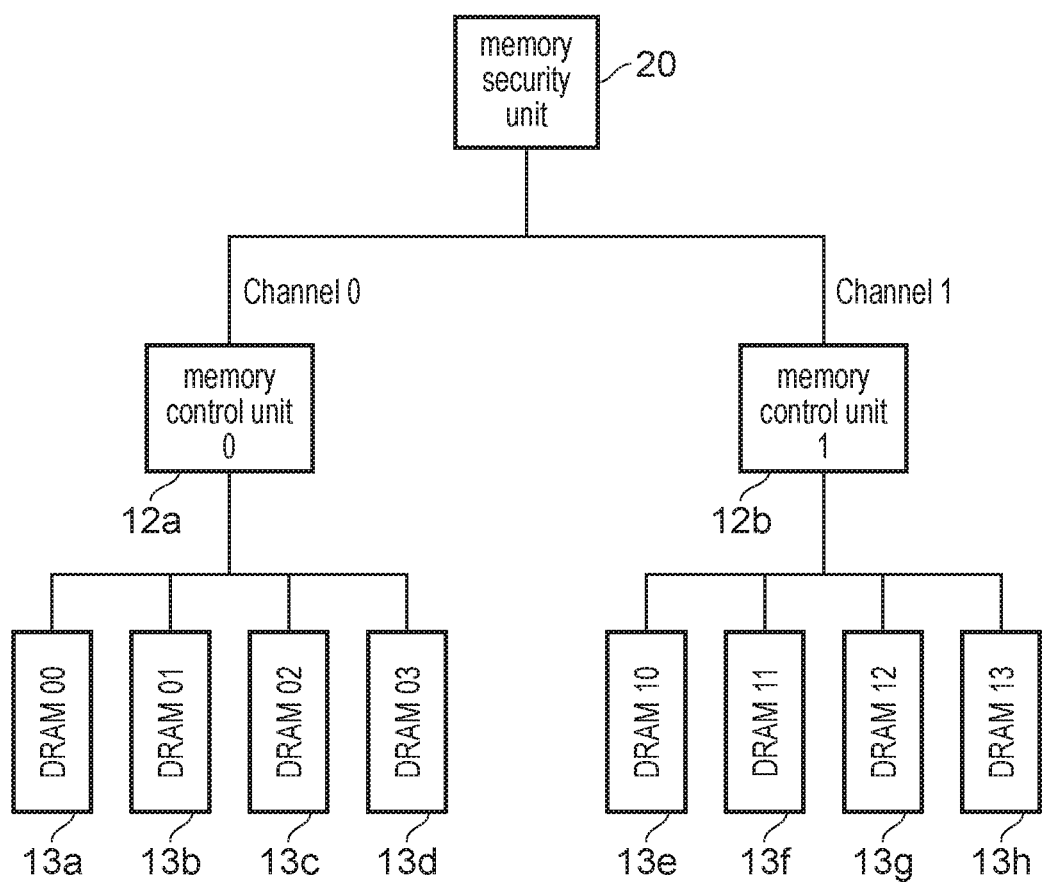
FIG. 8 shows an example of a multi-channel memory system.

In the examples described so far, it has been assumed that the data processing system 2 only has access to a single channel of memory. However, in some cases, the processing system 2 may include a plurality of memory channels. FIG. 8 shows an example of this, in which two memory channels are provided. In the example of FIG. 8, each channel comprises a number of DRAM banks 13, under the control of a memory controller 12 via a physical channel 16. In the example shown, both channels are under the influence of a single memory security unit 20, in a "one-to-many" arrangement. However, it will be noted that it is also possible for the memory channels to be arranged in a "many-to-many" configuration, in which a separate memory security unit 20 is provided for each channel.

Figure 9:
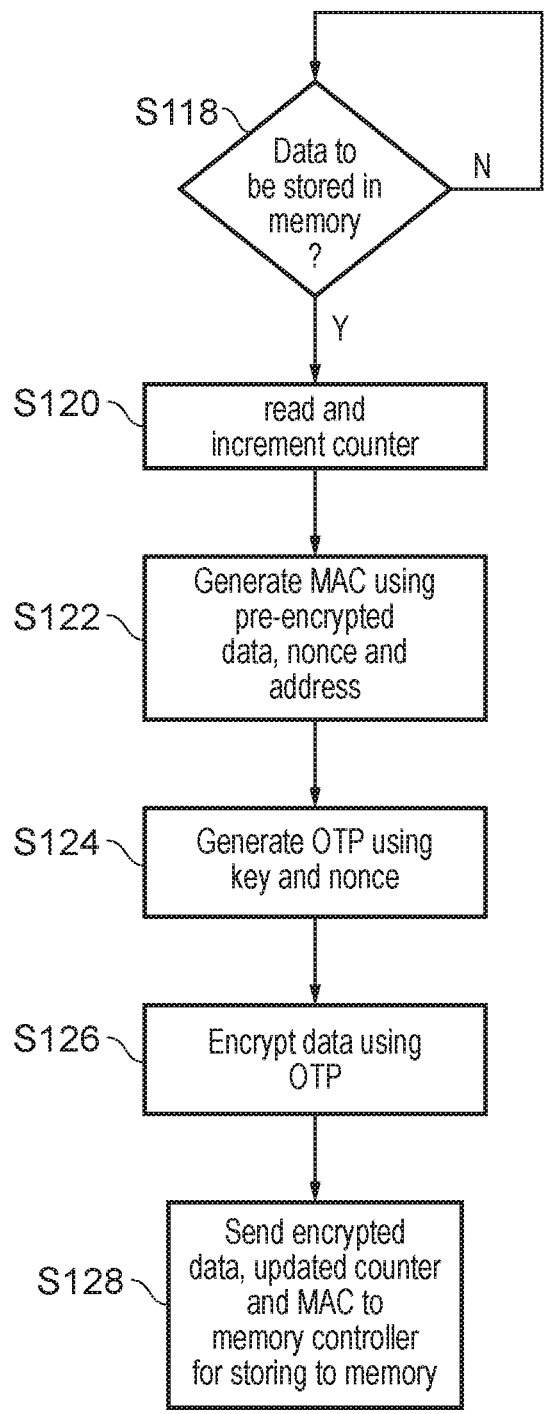
FIG. 9 is a flow diagram showing how data can be encrypted and stored in memory.

FIG. 9 is a flow diagram illustrating how data can be stored to memory. In a step S118, it is determined whether or not there is data to be stored to memory 5 (e.g. whether or not a store request has been received). If it is determined that there is no data to be stored in memory, step S118 is repeated. On the other hand, if it is determined that there is data to be stored to memory (e.g. a store request has been received), a counter associated with the address to which the data is to be written is read from memory and incremented S120, to indicate the occurrence of a write to that address. When reading the counter, its integrity may be checked by traversing up an integrity tree such as the tree shown in FIG. 5, or the tree in FIG. 6. This may involve a number of reads and verifications of different counters or MACs at earlier nodes of the tree, as well as verification using the on-chip root of trust.

In a step S122, a MAC is generated using the unencrypted (plaintext) data to be stored, a nonce based on the counter and the associated address.

In a step S124, a unique one-time-pad (OTP) is generated using an encryption key and the nonce, and in step S126 the data is encrypted using the OTP.

Once the data has been encrypted and the MAC has been generated, the encrypted data, the MAC and the updated counters are sent S128 to the memory controller 12 to be written to memory 5.

Figure 10:
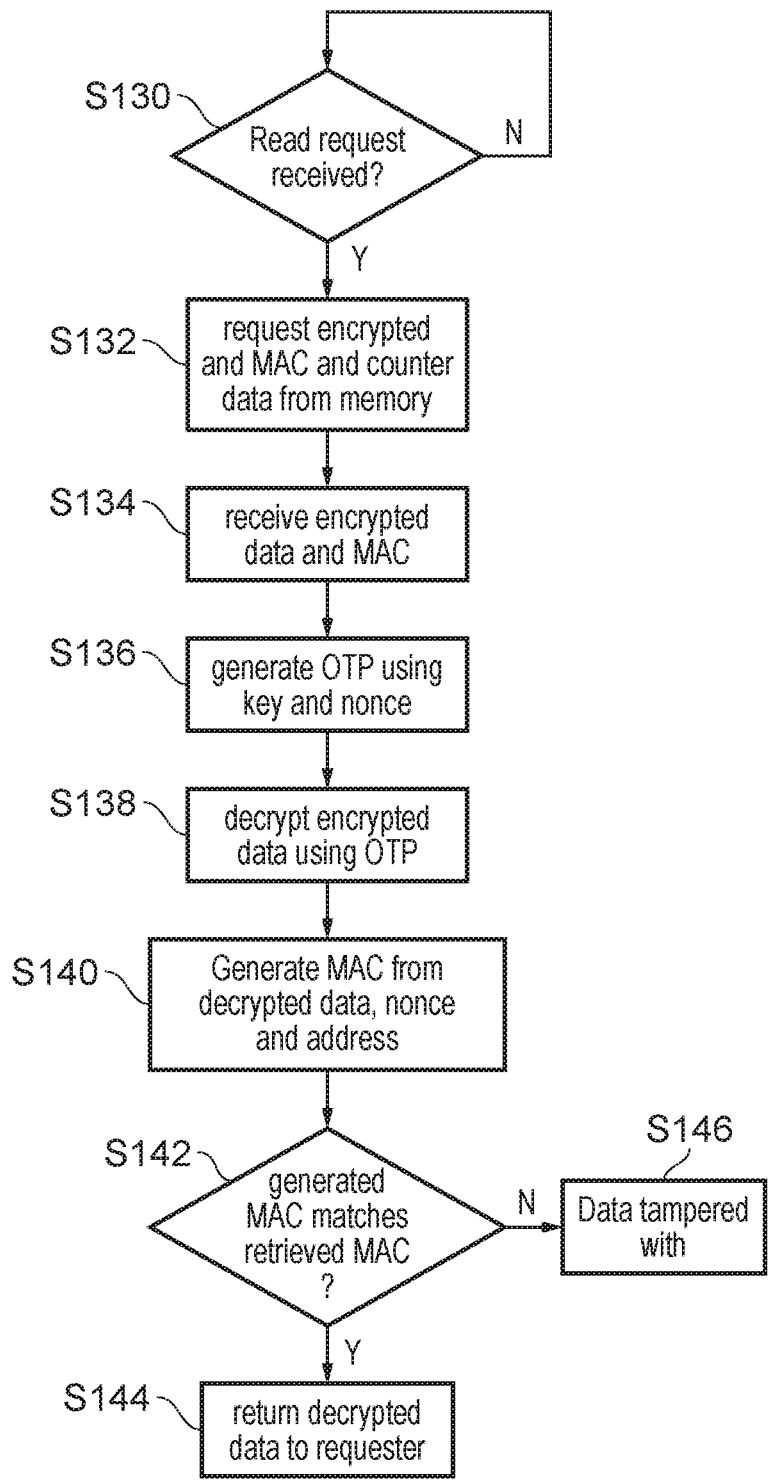
FIG. 10 is a flow diagram showing how encrypted data can be read from memory.

FIG. 10 is a flow diagram illustrating how data can be read from memory. In a step S130, it is determined whether a read request has been received. If a read request has not been received, step S130 repeats; if a read request has been received, a request is issued S132 to the memory controller 12 for the encrypted data specified by the read request and the associated MAC to be retrieved from memory 5. The encrypted data is then received S134. Once the MAC and counter have been read, they may be verified by traversing up an integrity tree such as the tree shown in FIG. 5, or the tree in FIG. 6. As discussed above, this may involve a number of reads/verifications of different counters or MACs at earlier nodes of the tree, as well as verification using the on-chip root of trust. This allows for detection of attacks where the data and its corresponding MAC have been replaced by a different, also matching, pair of MAC and data.

In a step S136, an OTP is generated using a key and a nonce, the nonce being based on a counter associated with the read address. The OTP is then used S138 to decrypt the encrypted data.

In a step S140, a MAC is generated from the decrypted data, the nonce and the read address. The MAC is compared (S142) with the MAC that was retrieved from memory. If the two MACs match, the data that was read and decrypted is returned S144 to the requesting agent. On the other hand, if the two MACs do not match, it is determined S146 that the data has been tampered with since it was stored.

Figure 11:
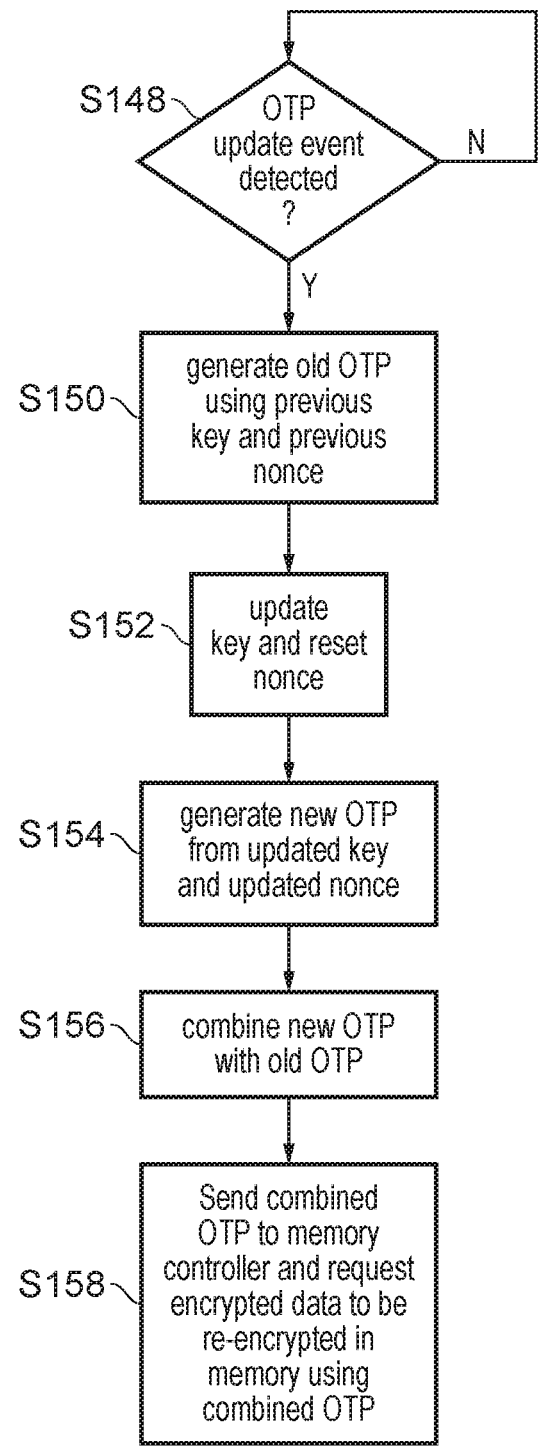
FIG. 11 is a flow diagram showing how encrypted data can be re-encrypted using a new one-time-pad (OTP).

FIG. 11 is a flow diagram illustrating how data can be re-encrypted in memory following an OTP update event. In a step S148, it is determined whether an OTP update event (e.g. an indication that a predetermined time has passed since the encryption key was last updated, or a counter overflow event—possibly triggered by incrementing the counter at step S120 of FIG. 9) has taken place. If an OTP update event has not been detected, step S148 repeats. On the other hand, if an OTP update event has been detected, the method includes generating S150 the old OTP based on the previous values of the key and nonce, updating S152 the key and nonce, and generating S154 a new OTP from the updated key and nonce values. A combined OTP can then be generated at S156.

Once the combined OTP has been generated, a re-encryption request is issued S158 to the memory controller 12, along with the combined OTP, for data encrypted using the old OTP to be re-encrypted in memory 5 using the combined OTP.

In the above examples, encrypted data can be re-encrypted in a downstream component (such as in memory) following an OTP update event. This avoids the need to read the data from memory and write it back to memory when re-encrypting the data, saving significant energy and time.

The above examples can also be implemented in software. For example, a non-transitory storage medium may be provided, and may store computer program instructions configured to cause a computer to perform any of the methods described above.

There are many situations in which a software implementation of the present technique could be beneficial. For example, a host operating system may perform encryption of data, and may generate the re-encryption request described in the above examples, under the control of computer program instructions mentioned above. The re-encryption request may then be passed to a downstream storage device to be carried out according to the above examples. Alternatively, host operating system may be operating in a network block device, an the request may be carried out by a downstream component (external hardware) such as a storage controller or a server. The combination of the first and second OTPs at the requesting software, with the re-encryption based on the combined OTP at a downstream component, can also help save latency for similar reasons to the examples given above.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

We claim:
1. An apparatus comprising:
memory control circuitry configured to control access to data stored in memory; and
memory security circuitry configured to generate encrypted data to be stored in the memory, the encrypted data being based on target data and a first one-time-pad (OTP);
wherein:
the memory security circuitry is configured to be within a trust boundary of the apparatus, and data stored outside the trust boundary is accessible to external agents;
in response to an OTP update event indicating that the first OTP is to be updated to a second OTP different from the first OTP, the memory security circuitry is configured to generate a re-encryption value based on the first OTP and the second OTP, and the memory security circuitry is configured to issue a re-encryption request beyond the trust boundary to cause updated encrypted data to be generated outside the trust boundary in a downstream component based on the encrypted data and the re-encryption value and to cause the encrypted data to be replaced in the memory by the updated encrypted data; and
the updated encrypted data is generated in at least one of:
the memory, wherein the memory is outside the trust boundary;
a memory controller for controlling access to the memory, wherein the memory controller is outside the trust boundary;
at least one dynamic random access memory (DRAM) unit, wherein the at least one DRAM unit is outside the trust boundary; and
a controller associated with a three-dimensional integrated circuit comprising a plurality of memory storage integrated circuit layers, wherein the controller associated with the three-dimensional integrated circuit is outside the trust boundary.

2. The apparatus of claim 1, wherein:
the first OTP is dependent on first values of a key and a nonce at a time of encrypting the target data;
the second OTP is dependent on second values of the key and the nonce obtained in response to the OTP update event; and
the memory security circuitry is configured to generate the re-encryption value based on the first values of the key and the nonce and the second values of the key and the nonce.

3. The apparatus of claim 2, wherein:
the OTP update event comprises an indication that a predetermined period has passed since a previous key update event for updating the key.

4. The apparatus of claim 2, wherein:
the nonce comprises a counter, and the memory security circuitry is configured to increment the counter in response to a write to the address in memory associated with the encrypted data; and
the OTP update event comprises a counter overflow event associated with the counter.

5. The apparatus of claim 4, wherein:
the counter comprises a split counter comprising a combination of a major counter shared between a plurality of data blocks including the target data and at least one other data block, and a respective minor counter specified separately for each data block in the plurality of data blocks; and the OTP update event comprises at least one of:
   a major counter overflow event associated with the major counter; and
   a minor counter overflow event associated with a minor counter associated with a given data block among said at least one other data block.

6. The apparatus of claim 5, wherein the memory security circuitry is configured to perform at least one of:
   in response to the minor counter overflow event, incrementing the major counter and issuing the re-encryption request for the plurality of data blocks other than said given data block; and
   in response to the major counter overflow event, updating the key and issuing the re-encryption request for data blocks encrypted using the previous value of the key.

7. The apparatus of claim 1, wherein
the re-encryption request comprises a request to cause the updated encrypted data to be generated in the downstream component by applying an exclusive-OR function to the re-encryption value and the encrypted data.

8. The apparatus of claim 1, wherein:
following the re-encryption request, the updated encrypted data is decryptable based on the second OTP independently of the first OTP.

9. The apparatus of claim 1, wherein:
the memory security circuitry is configured to generate an authentication code to be stored in the memory, generation of the authentication code comprising applying a hash function to the target data;
at a time of reading data from an address associated with the target data in the memory, the memory security circuitry is configured to compare the authentication code with a result of decrypting the read data and applying the hash function to the decrypted data.

10. The apparatus of claim 9, wherein in the generation of the authentication code, the hash function is applied to a value which the target data has prior to encryption based on the first OTP.

11. The apparatus of claim 9, wherein:
the generation of the authentication code comprises applying an operation to a first value dependent on a hash value obtained by applying the hash function to the target data, and a second value dependent on an authentication OTP, the authentication OTP being independent of the target data.

12. The apparatus of claim 11, wherein the operation and an inverse of the operation each comprise an associative operation.

13. The apparatus of claim 11, wherein the first value depends on a first key, and the authentication OTP depends on a second key.

14. The apparatus of claim 11, wherein:
in response to an authentication update event indicating that the authentication OTP is to be replaced by an updated authentication OTP different from the authentication OTP, the memory security circuitry is configured to generate an authentication re-calculation value based on the authentication OTP and the updated authentication OTP, and the memory security circuitry is configured to issue an authentication re-calculation request to cause an updated authentication code to be generated in the downstream component based on the authentication code and the re-calculation value and to cause the authentication code to be replaced in memory by the updated authentication code.

15. The apparatus of claim 14, wherein:
the authentication OTP is dependent on an authentication key and an authentication nonce; and
the authentication update event comprises at least one of:
   an event indicating that the authentication key is to be replaced by an updated authentication key different from the authentication key;
   an event indicating that the authentication nonce is to be replaced by an updated authentication nonce different from the authentication nonce.

16. The apparatus of claim 1, wherein the memory security circuitry is configured to perform at least one of:
generating the encrypted data by applying an exclusive-OR function to the target data and the first OTP; and
generating the re-encryption value by applying an exclusive-OR function to the first OTP and the second OTP.

17. A method comprising:
generating, using memory security circuitry, encrypted data to be stored in memory, wherein the encrypted data is based on target data and a first one-time-pad (OTP), the memory security circuitry is within a trust boundary of an apparatus, and data stored outside the trust boundary is accessible to external agents; and
in response to an OTP update event indicating that the first OTP is to be updated to a second OTP different from the first OTP, generating, using the memory security circuitry, a re-encryption value based on the first OTP and the second OTP, and issuing, using the memory security circuitry, a re-encryption request beyond the trust boundary to cause updated encrypted data to be generated outside the trust boundary in a downstream component based on the encrypted data and the re-encryption value and to cause the encrypted data to be replaced in the memory by the updated encrypted data,
wherein the updated encrypted data is generated in at least one of:
   the memory, wherein the memory is outside the trust boundary;
   a memory controller for controlling access to the memory, wherein the memory controller is outside the trust boundary;
   at least one dynamic random access memory (DRAM) unit, wherein the at least one DRAM unit is outside the trust boundary; and
   a controller associated with a three-dimensional integrated circuit comprising a plurality of memory storage integrated circuit layers, wherein the controller associated with the three-dimensional integrated circuit is outside the trust boundary.

18. A non-transitory storage medium storing computer program instructions configured to cause a computer to perform the method of claim 1.

* * * * *